United States Patent [19]

Stokes

[11] Patent Number: 5,526,797
[45] Date of Patent: Jun. 18, 1996

[54] METHODS AND APPARATUS FOR VAPORIZING AND UTILIZING FUELS OF VARIOUS OCTANE RATINGS

[76] Inventor: Richard A. Stokes, 112 E. Fourth St., Apt. B-1, Aberdeen, Wash. 98520

[21] Appl. No.: 288,339

[22] Filed: Aug. 10, 1994

Related U.S. Application Data

[63] Continuation-in-part of Ser. No. 178,662, Jan. 7, 1994.

[51] Int. Cl.[6] .................... F02B 13/00; F02M 21/02
[52] U.S. Cl. ..................... 123/575; 123/528; 123/525
[58] Field of Search ...................... 123/531, 561, 123/27 GE, 525, 526, 528, 575, 565

[56] References Cited

U.S. PATENT DOCUMENTS

| | | | |
|---|---|---|---|
| 4,489,699 | 12/1984 | Poehlman | 123/525 |
| 4,492,207 | 1/1985 | Hallberg | 123/527 |
| 4,513,727 | 4/1985 | Lagano et al. | 123/525 |
| 4,535,728 | 8/1985 | Batchelor | 123/575 |
| 4,546,732 | 10/1985 | Mae et al. | 123/575 |
| 4,641,625 | 2/1987 | Smith | 123/575 |
| 4,724,817 | 2/1988 | Cook | 123/565 |
| 4,800,862 | 1/1989 | McKay et al. | 123/531 |
| 4,876,988 | 10/1989 | Paul et al. | 123/1 A |
| 4,936,280 | 6/1990 | Langlois | 123/578 |
| 4,995,367 | 2/1991 | Yamauchi et al. | 123/575 |
| 5,014,670 | 5/1991 | Mitsumoto | 123/575 |
| 5,101,800 | 4/1992 | Schumann et al. | 123/531 |
| 5,115,787 | 5/1992 | vonPickartz | 123/549 |
| 5,119,794 | 6/1992 | Kushida et al. | 123/549 |
| 5,139,002 | 8/1992 | Lynch et al. | 123/575 |

*Primary Examiner*—Erick R. Solis
*Attorney, Agent, or Firm*—Eugene Stephens & Associates

[57] ABSTRACT

Modifications to the cylinder head of internal combustion engines in which the efficiency of fuel combustion is raised by the use of a plurality of liquid, vaporized liquid, and gaseous fuels through the alteration of cylinder compression ratios and spark timing to burn those fuels. It has been demonstrated that certain fuels have salient advantages under specified engine speed and load conditions, and in selected enviroments and vehicle applications, but that no single fuel is capable of excelling in all potential application scenarios. Burning each of these fuels efficiently has required engine specifications optimized to a single fuel or fuel state, such as compression ratio, intake tract design, electronic fuel injector duration and timing, and spark timing curves, which have been severely compromised when they were required to cope with the demands of a second fuel. The solutions demonstrated seek to show how these past compromises may be eliminated or minimized to enable the singular and simultaneous use of selected fuels to increase performance, reduce combustion pollutants, and increase the engine life of internal combustion engines. In addition, many of the possible alternate fuels which may be adapted to this proposal are in abundant domestic supply, and would reduce the undesirable economic effects which accompany large-scale petroleum imports; the consequential balance of trade deficits, dependence on volatile foreign sources,and vunerable tanker fleets and refining facilities.

19 Claims, 12 Drawing Sheets

METHODS AND APPARATUS FOR VAPORIZING AND UTILIZING FUELS OF VARIOUS OCTANE RATINGS

RELATED APPLICATIONS

This application is a Continuation-In-Part of allowed parent application Ser. No. 08/178,662, filed 7 Jan. 1994, entitled PLURAL FUEL SYSTEM FOR INTERNAL COMBUSTION ENGINE. The parent application is hereby incorporated by reference.

BACKGROUND OF THE INVENTION

This invention involves fuel systems for internal combustion engines. A multitude of fuels have been used in internal combustion engines, including gasoline, propane, compressed and liquified natural gas, methanol, ethanol and hydrogen. Each of these fuels, or fuel states(liquid or gaseous), has advantages and disadvantages in their specification and use. For example, variables such as octane rating,energy content(BTU/gallon or volume yield), flame travel velocity, storage and refueling ease and safety, toxicity,and combustion by-product production, best serve certain engine load and vehicle use scenarios, but remain a compromise in actual application, Until now, various attempts have been made to address this problem by using a plurality of fuels which may be selected as alternatives, such as described in U.S. Pat. No. 4,489,699, to Poehlman,, 4,492,207 to Hallberg, or 4,535, 728, to Batchelor. Or by a liquid and gaseous fuel system where the selection and volume of each fuel may vary, but is unable to meter and mix fuels in precise quantities in real time because it employs a mechanical injection pump with only two positions, and is unable to gasify liquid fuels on demand,such as described in U.S. Pat. No. 4,641,625, to Smith. Or by injecting two different liquid fuels,the first to start and run a cold engine,the other to run the engine at operating temperatures, such as described in U.S. Pat. No. 4,546,732, to Mae and Miyauchi, or 4,936,280 to Langlois. Or by phased injection into a Diesel engine of two liquid fuels of supplemental chemical properties,such as hydrogen or carbon content,(E.G.-alcohol and gasoline), as described in U.S. Pat. No. 4,876,988, to Paul, or by my own earlier application Ser. No. 178,662. There have also been attempts to aid the atomization of liquid fuel injectors, or the vaporization of carburetor or fuel injector outputs,all of which have demonstrated limitations which the present invention avoids or minimizes. The incomplete atomization of fuel injector output is primarily responsible for fuel droplets which are not reduced to a single molecule, lowering efficient bonding to the oxidizer. Because of this incomplete combustion, unburned fuel passes out of the engine, and is either burned, catalyzed, or enters the atmosphere as a airborne pollutant in the form of unburned HC emissions. Present fuel systems are inefficient because of this incomplete combustion,and the use of a single fuel which remains a compromise under some engine speed and load demands. In addition,present fuel systems cannot respond in real time to changing engine speed and load demands by selecting a liquid or gaseous fuel state, burning a second or third liquid or gaseous fuel, or altering the compression ratio and/or charge density for the fuel or fuels being burned. The inefficiencies of present fuel systems and combustion processes also require that auxiliary devices such as catalytic converters, and exhaust gas recirculation be employed to control pollutants such as carbon monoxide (CO), oxides of nitrogen(NOx), and unburned hydrocarbons (HC). The present invention, being a continuation in part of my earlier application, 178,662 demonstrates a series of design solutions which acknowledge that more fundamental and efficient designs require modifications to the cylinder head casting and internal parts. The earlier design solutions, in contrast, sought to adapt themselves to existing automotive and truck engines with minimal modifications, and emphasized complete multi-fuel systems, with many more components and variants. Otherwise, both proposals seek to solve the same problems, and employ many of the same principles.

SUMMARY OF THE INVENTION

This invention aims at incorporating the requirements of a plural fuel system into several mechanical and electromechanical design solutions. It involves several methods of varying the compression ratio of an internal combustion engine to suit the fuel(s) being burned, vaporizing the output of the fuel injector, methods of injecting the vaporized fuel under pressure, incorporating E.G.R. into the system design, and various valve actuating apparatus. Although the system utilizes electronic input sensing and output devices under the control of an electronic management unit, these are not emphasized because they are not central to the present proposals. Briefly, the system consists of a E.M.U.(electronic management unit) which receives inputs from the following sensors; a knock sensor, a throttle position sensor, a M.A.P. (manifold absolute pressure) sensor, a sync pulse sensor, a R.P.M. sensor, A oxygen sensor, a ambient air temperature sensor, a coolant temperature sensor, a liquid fuel tank level sensor, and a gaseous fuel tank pressure sensor, and, where appropriate, a air compressor or supercharger R.P.M. sensor. Typical E.M.U. outputs include the duration and timing for the electronic fuel injectors and vapor chamber valves, the modification of the spark curve, E.G.R. activation,and,where appropriate, the engagement and dis-engagement of the air compressor. The system is supplied by at least one liquid fuel tank and at least one gaseous or liquified gaseous fuel tank. These fuels are selected by the E.M.U. for the optimization of engine speed and load conditions.

Figure 1A:
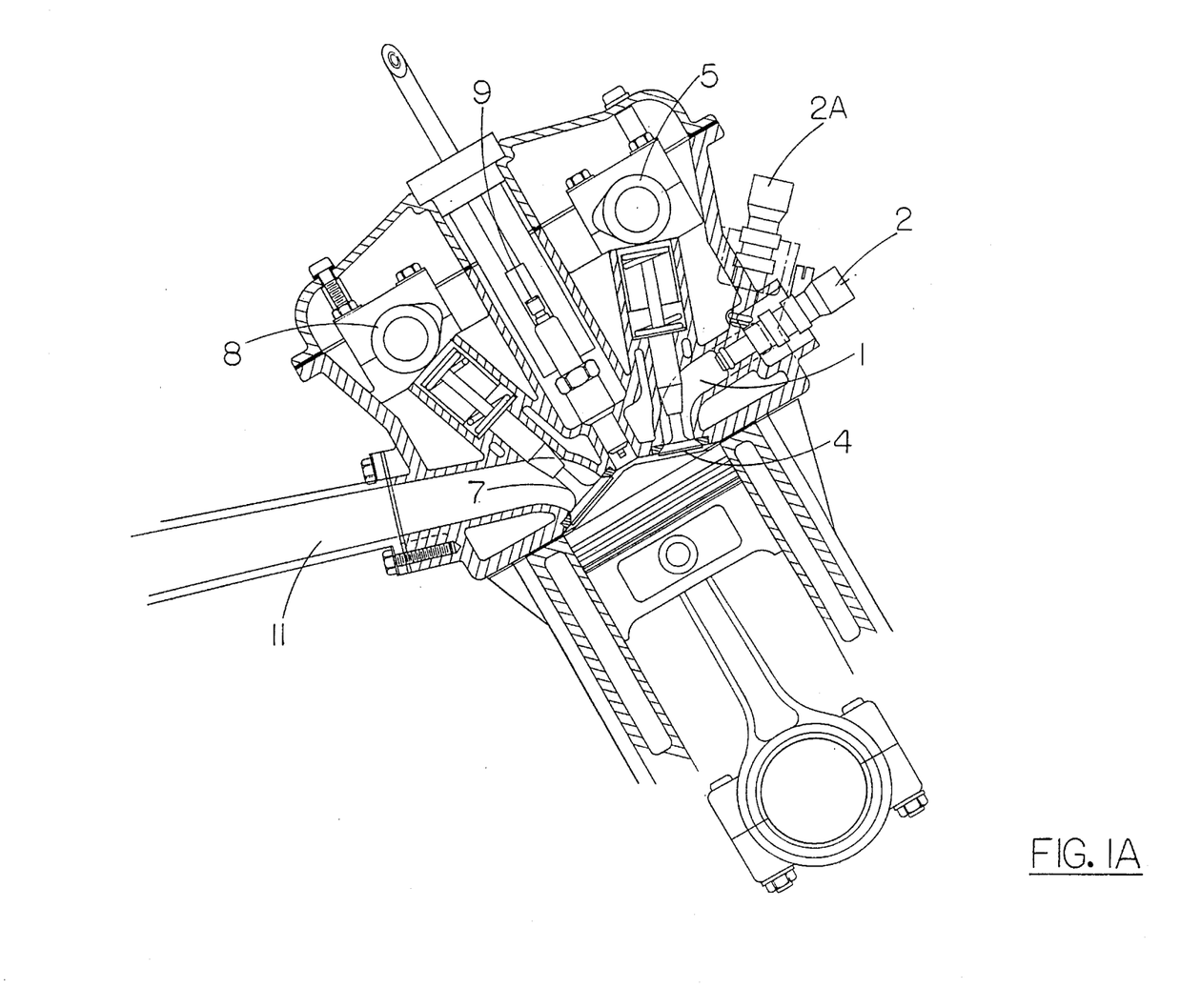
FIG. 1 is a three-valve-per-cylinder, D.O.H.C. cylinder head and the associated parts of a internal combustion engine with a exhaust-side vapor chamber, and a mechanically actuated vapor chamber valve.
Figures 1B, 1C:
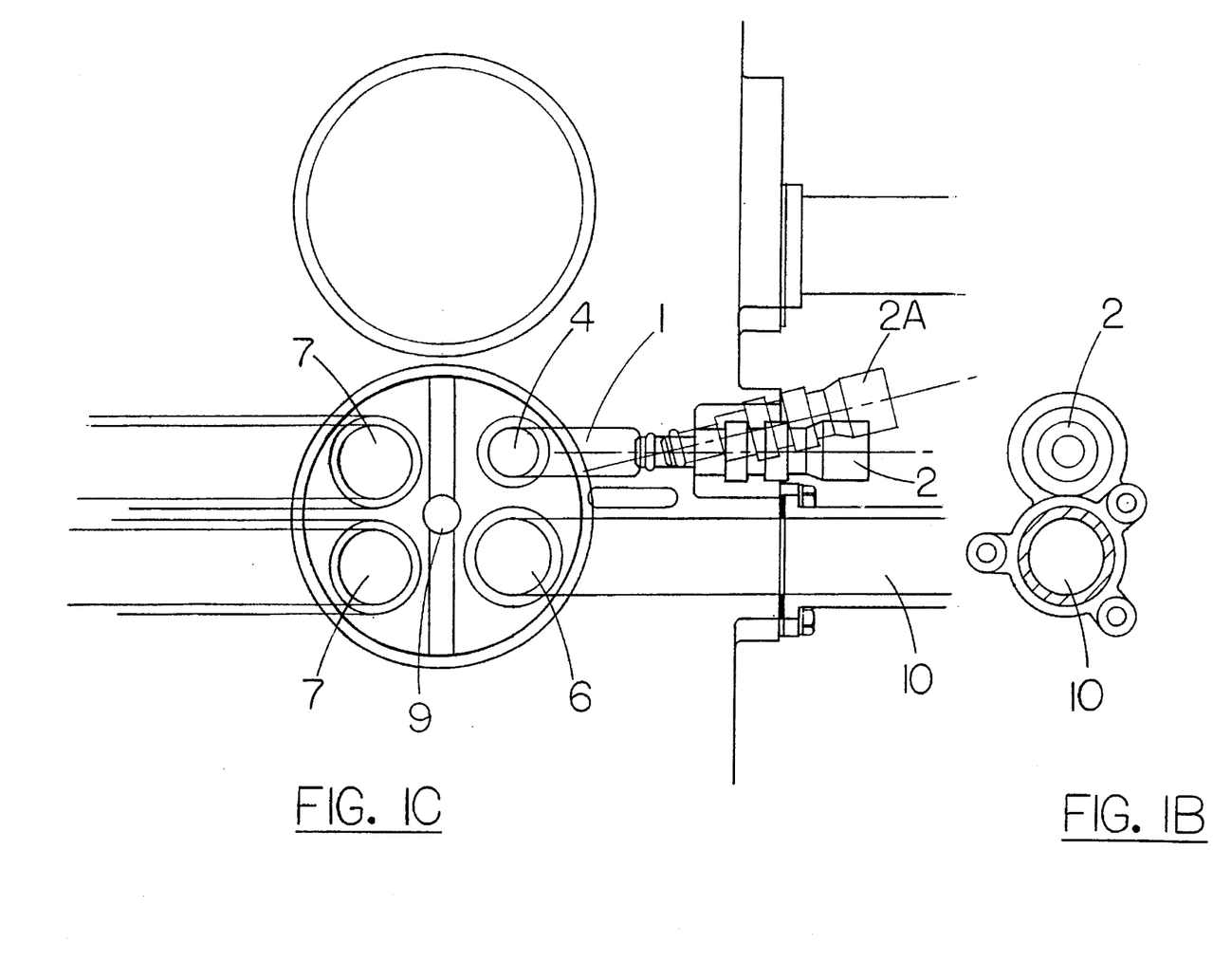
FIG. 1B is a external detail view which illustrates the relationship between the exhaust manifold and vapor chamber fuel injector seat.(injector removed)
FIG. 1C is a top view which illustrates the layout of the combustion chamber,dual intake valves, exhaust valve, spark plug and vapor chamber.

FIGS. 1A, 1B and 1C utilize a mechanical actuation system for the vapor chamber valve, and must therefore employ variable electronically regulated compression ratio boost (from an external air compressor), to alter the compression ratio to achieve multi-fuel and fuel state compatibility.

FIGS. 2A through 5B demonstrate several design solutions for fuel vaporization chambers which utilize electronically-regulated vapor chamber valves. These variations utilize cylinder compressed air generated during the early phase of the compression stroke to pressurize a fuel vaporization chamber or manifold. Said compressed air is then used as a medium to re-inject vaporized fuel into the engine cylinder during the intake stroke. Some design variants demonstrate external compressed air or gaseous fuel feed from a external or intergrally cast manifold. Others demonstrate additive (by a external air compressor), and subtractive (by a electronically controlled valve which relieves compressed cylinder air), compression ratio modification to burn high and low octane fuels.

Figures 6, 6A:
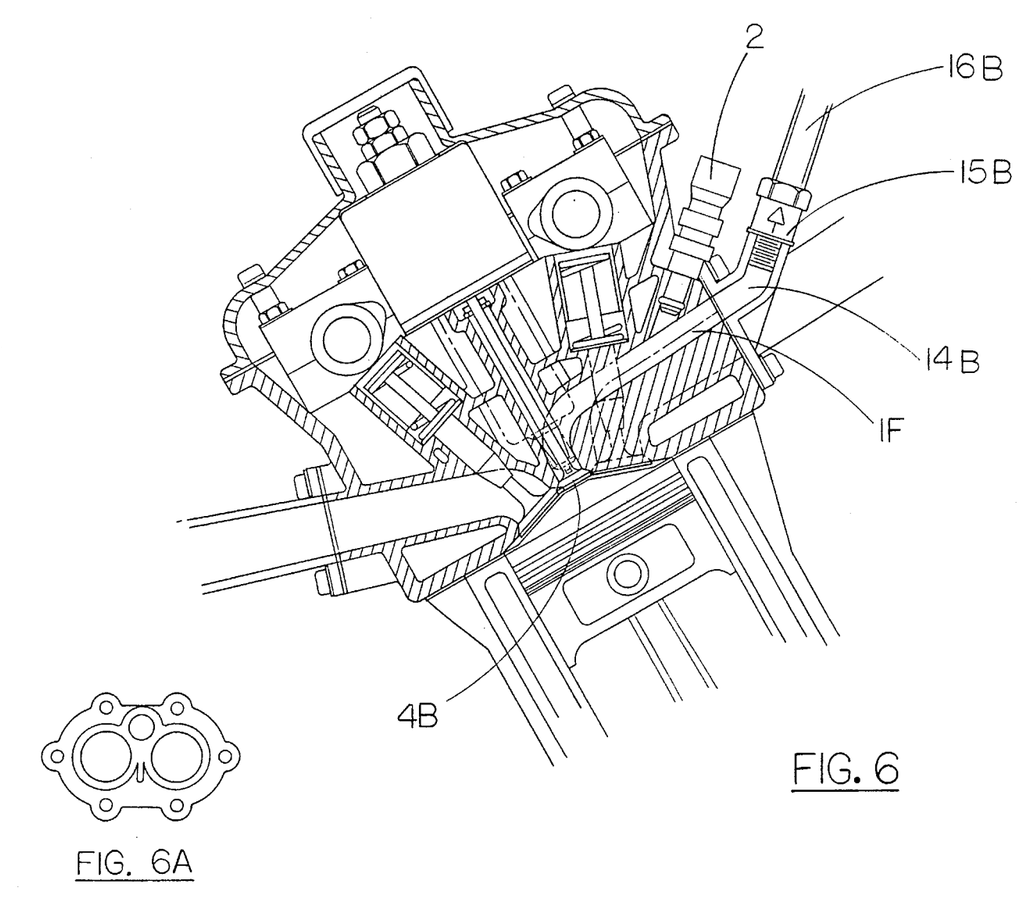
FIG. 6 is a sectioned view of the first embodiment of a 4-valve D.O.H.C. cylinder head and the associated parts of an internal combustion engine with a exhaust-side fuel vaporization chamber/air extraction manifold equipped with a electronically-regulated popper valve which adjusts the compression ratio of the engine cylinder.
FIG. 6A is a view of the exhaust manifold mounting flange which illustrates the layout of the exhaust poets and the air extraction manifold 14B.

FIG. 6 illustrates a variable-compression ratio cylinder head concept which utilizes a electronically-regulated valve to relieve compressed cylinder air of varied volumes into a vapor chamber/air extraction manifold. This apparatus alters the compression ratio by varying the timing and duration of the vapor chamber valve, and therefore the pressure and volume, of compressed air relieved from the cylinder. The system is designed to accommodate a high compression ratio of 13:1 (with no cylinder air bleed by the vapor chamber electronic valve), burning straight natural gas, or a similar high octane gaseous fuel.

Figures 7, 7A:
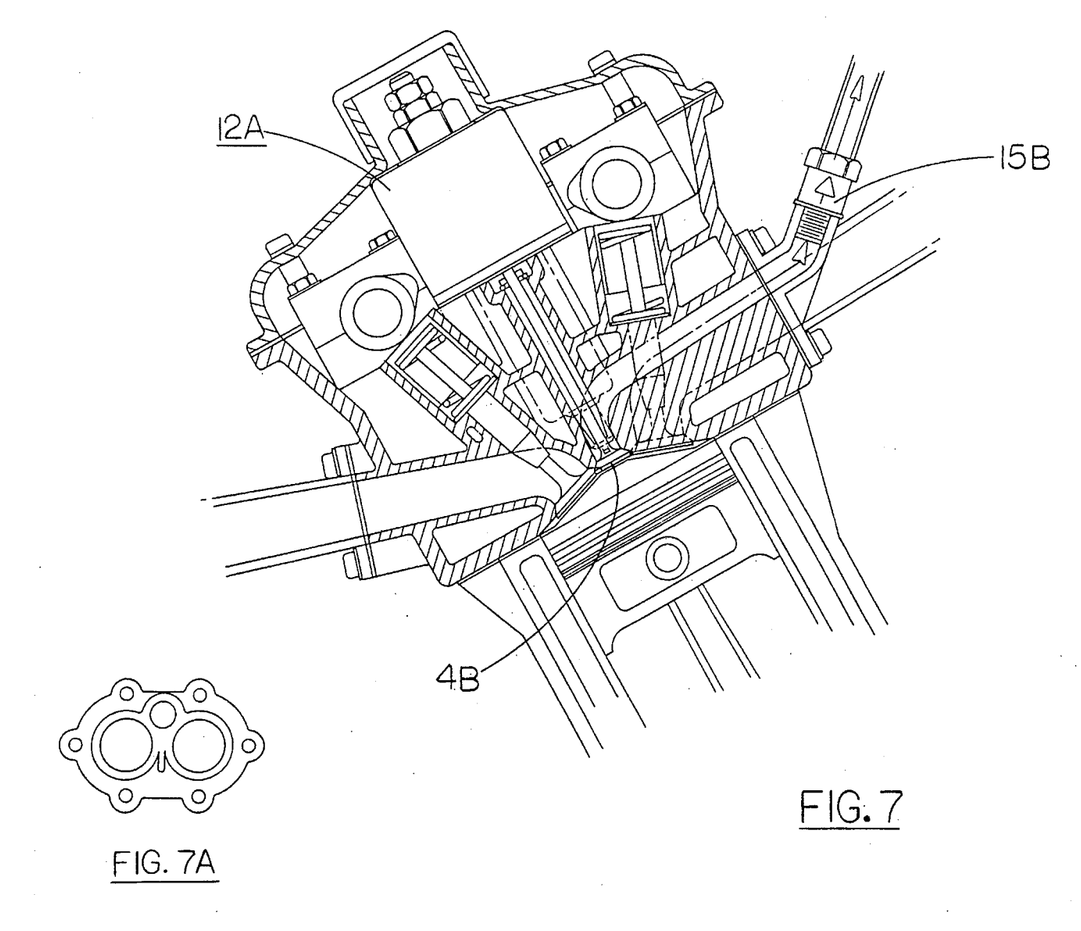
FIG. 7 is a sectioned view of a system much like that illustrated in FIG. 6 except that it does not utilize a fuel vaporization chamber, but instead demonstrates compression ratio alteration by means of a electronically-controlled relief valve.
FIG. 7A is a view of the exhaust manifold mounting flange which illustrate the layout of the exhaust ports and the air extraction manifold.

FIG. 7 is sectioned view of a system much like that illustrated in FIG.6 except that it does not utilize a fuel vaporization chamber, but instead demonstrates compression ratio alteration by means of a electronically-controlled relief valve, a check valve, and a air extraction manifold.

Figure 8:
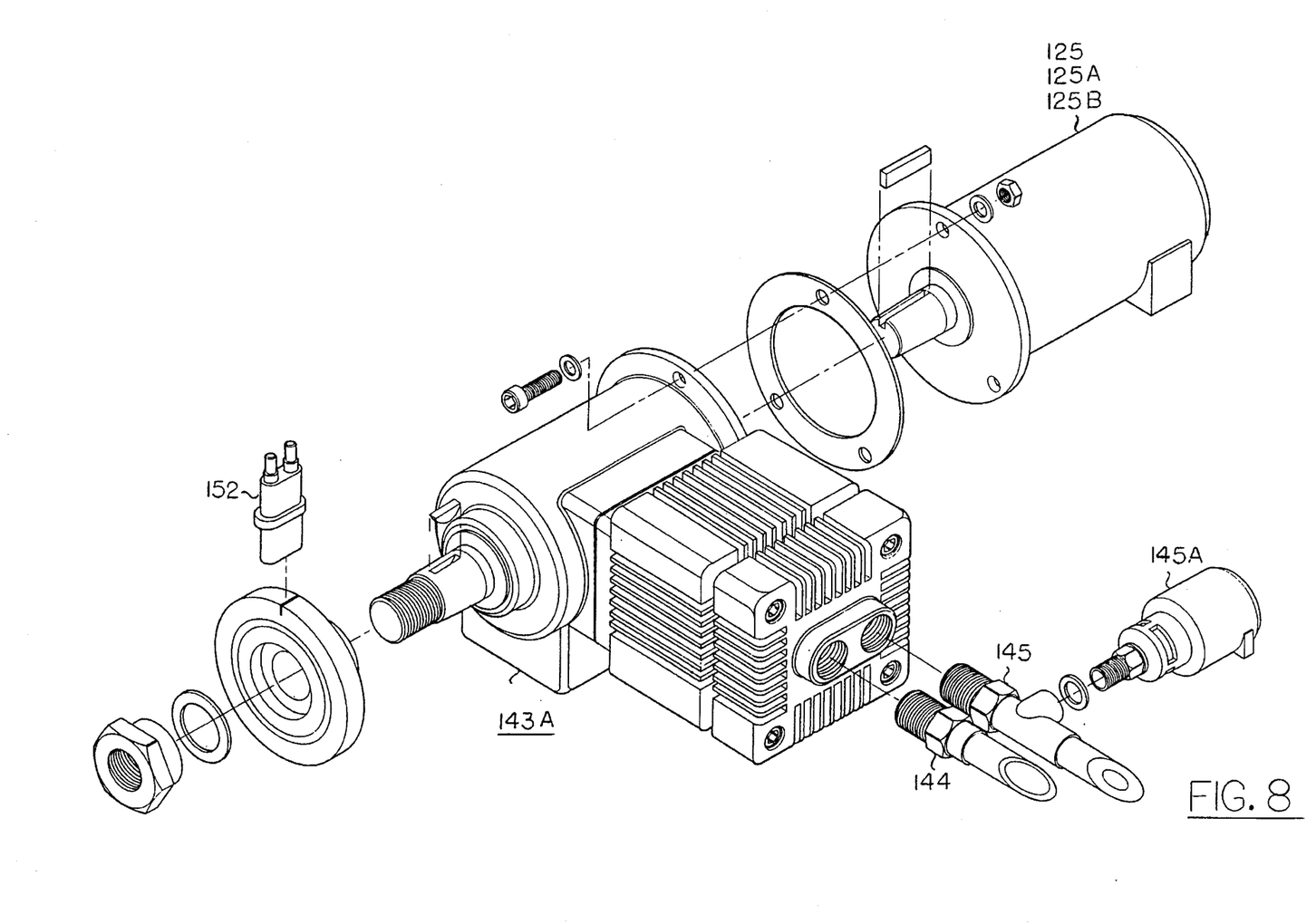
FIG. 8 is a exploded view of a air compressor which is used to alter the compression ratio of the engine cylinder by adding varying volumes of compressed air. Four drive and control methods of regulating the compressor's output are presented and discussed.

FIG. 8 is a exploded view of a air compressor which is used to modify the compression ratio of the cylinder, and is supplied for reference from a earlier application.

DETAILED DESCRIPTION OF THE EMBODIMENTS

With reference to the drawings,

FIG. 1A is a sectioned view of the first embodiment of a three-valve per cylinder (two intake, one exhaust), D.O.H.C. cylinder head and the associated parts of an internal combustion engine, which is designed to burn two or more liquid or gaseous fuels, either separately, or in combination. A exhaust-side fuel vaporization chamber 1, which is heated by the engine coolant and the adjacent exhaust port, vaporizes the output of a electronic fuel injector 2. (the alternate position for this fuel injector is illustrated by part 2A). Fuel injector 2 or 2A, is controlled for duration and timing by a electronic management unit 3 (not shown). E.M.U. 3 receives data inputs from the following condition sensors; a knock sensor, a throttle sensor, a M.A.P. (manifold absolute pressure) sensor, a sync pulse sensor, a R.P.M. sensor, a oxygen sensor, a ambient air temperature sensor, a coolant temperature sensor, a liquid fuel tank level sensor, a gaseous fuel tank pressure sensor, and, where appropriate, a air compressor R.P.M. sensor. Typical E.M.U. outputs include the duration and timing for the electronic fuel injectors and vapor chamber valves, selection of the fuel and fuel state for engine load and speed requirements, the modification of the spark curve, E.G.R. activation, and, where appropriate, the engagement and dis-engagement of the air compressor used to alter the compression ratio. The system is supplied by at least one liquid fuel tank and at least one gaseous or liquified gaseous fuel tank. With the exception of E.M.U. 3, air compressor R.P.M. sensor 152, and knock sensor 13, the other components of the I/O system are neither discussed, referanced, or illustrated.

A vapor chamber valve 4, is operated in response to the fuel(s) being burned in the following manner; if natural gas, or a similiar high octane gaseous fuel is burned exclusively, valve 4 will remain closed. If unleaded gasoline, or a similiar low octane liquid fuel is burned, valve 4 will open during the early phase of the compression stroke in order to divert a portion of the compressed cylinder air into vapor chamber 1. When a adequate volume of compressed cylinder air has been diverted into vapor chamber 1, valve 4 closes in order to retain the compressed cylinder air as a propellant for the fuel vapors. Valve 4 stays closed through the remainder of the compression stroke, and the succeeding power and exhaust strokes, opening again at the beginning of the next intake stroke to admit vaporized fuel and compressed air into the engine cylinder. Since the timing of fuel injector 2 or 2A commences with the closing of vapor chamber valve 4, the period that the liquid fuel has to vaporize is greatly extended to two and three-quarter engine strokes, or about 495 degrees of engine rotation. This period is governed by a vapor chamber valve cam 5, which shares a common shaft with the exhaust valve lobes. In order to burn natural gas, vapor chamber 1 is de-activated by selecting a alternative cam profile which would have no opening lobe, or by a neutral position selector, wherein no lobe is selected. This latter solution is preferred because it enables two active vapor chamber valve cam profiles 5, to be selected either seperately, or together; one for a low octane liquid fuel, the second for E.G.R. activation. This enables E.G.R. to be added independently to the combustion of natural gas or vaporized liquid fuel, as required. Because valve 4 is mechanically operated, it is limited to one or two lobe profiles which governs timing, duration and lift, and, as a consequence,is not as responsive to changing engine demands as a electronically-operated vapor chamber valve. In order to compensate for this shortcoming, a electronically controlled air compressor, as I described in my prior application Ser. No. 178,662, must be employed. This air compressor is driven by the engine or a electrical motor, and is controlled by E.M.U. 3, to supply the engine with a compression ratio boost by the addition of compressed air into the cylinders through the intake manifold. The details of this compressor are referenced in FIG. 8. Also shown are a intake valve 7, operated by a intake valve camshaft 8, a spark plug 9, and a intake manifold 11. NOTE: Alternate vaporization chamber functions, such as E.G.R., may be selected for the utilization of vapor chamber 1, by using a system such as Honda's V-Tech, which employs a electro-hydraulic device to alternate the selection of cam profiles for the operation of vapor chamber valve 4. E.G.R. activation is achieved by substituting compressed air with exhaust gases in vapor chamber 1 during the exhaust stroke, the exhaust gases and vaporized fuel being re-injected into the cylinder during the intake stroke. Activated when high combustion temperatures produce excessive N.Ox. levels. Employs alternative selection of vapor chamber cam lobe 5, to modify the timing and duration of vapor chamber valve 4. Controlled by E.M.U. 3.

The mixture of liquid and gaseous fuels for simultaneous combustion is not practical with a mechanical system. Since the required compression ratios for each fuel are much different, and the response time of the air compressor and the shifting to alternate vapor chamber cam profiles is not immediate, the two fuels are best utilized separately for prevailing engine speed and load conditions (such as accelerating or cruising), as well as ambient air and coolant temperatures.

FIG. 1B is an external detail view looking down the center line axis at a exhaust manifold 10, and the well and seat of fuel injector 2. (not shown)

FIG. 1C is an top view which illustrates the layout of the combustion chamber; vapor chamber 1, fuel injector 2,or A,vapor chamber valve 4, intake valves 7, exhaust valve 6, spark plug 9, and exhaust manifold 10.

OTHER FEATURES:
A. Alteration of spark timing according to fuel type, grade, and state, as well as engine speed and load.
B. Monitoring for detonation by a single system knock sensor, or one knock sensor per cylinder.

Figures 2A, 2B, 2C:
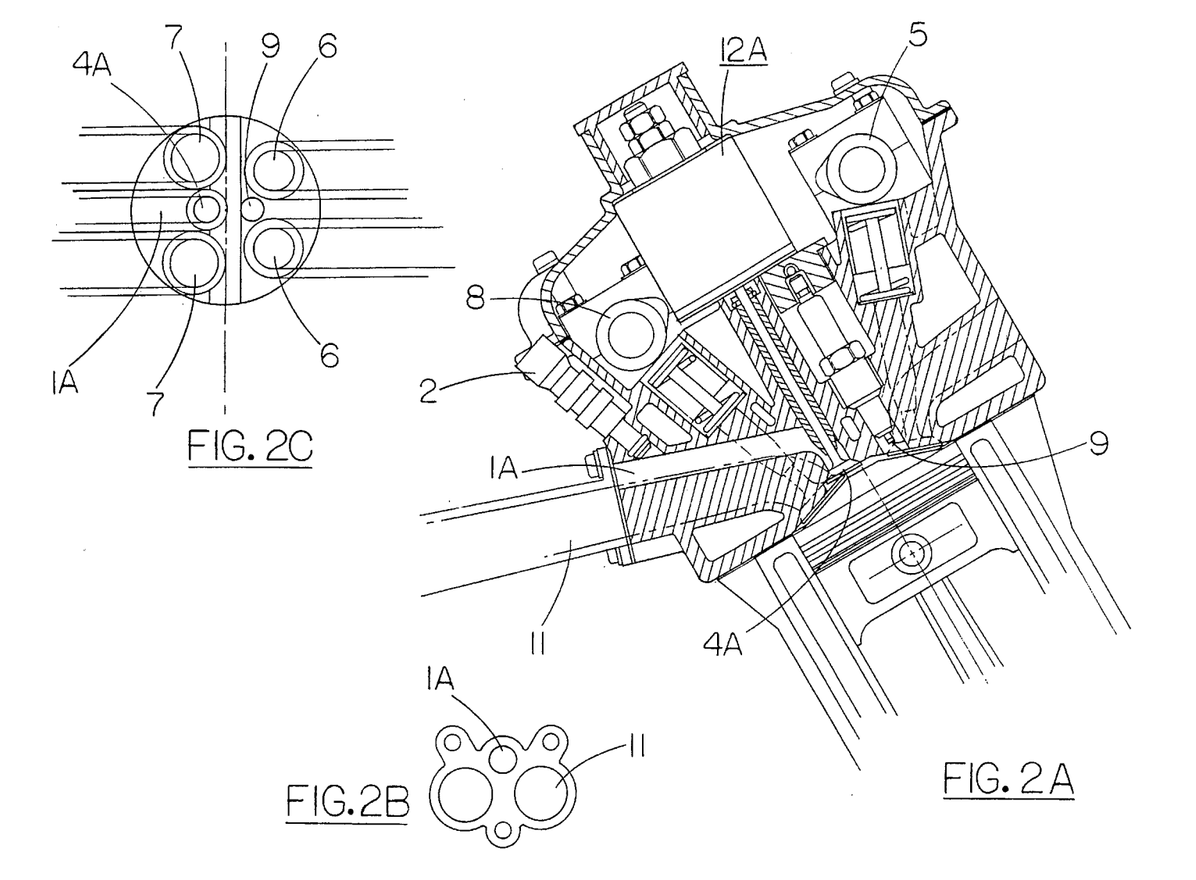
FIG. 2A is a sectioned view of the first embodiment of a four-valve D.O.H.C. cylinder head and the associated parts of an internal combustion engine with a intake-side vapor chamber which is equipped with a centrally-mounted, electronically-regulated popper valve.
FIG. 2B is a external detail view which illustrates the relationship between the intake manifold runners and the vaporization/chamber location.
FIG. 2C is a top view which illustrates the layout of the combustion chamber, dual intake and exhaust valves, vapor chamber, and/spark plug.

FIG. 2A is a sectioned view of the first embodiment of a four-valve-per-cylinder, D.O.H.C. cylinder head and the associated parts of a internal combustion engine which is designed to burn two or more liquid or gaseous fuels, either seperately, or in combination. A intake-side fuel vaporization chamber 1A, which is heated by engine coolant, vaporizes the output of a electronic fuel injector 2, which is controlled for duration and timing by a electronic management unit 3, (not shown), which also controls the timing and duration of a electronically-operated vapor chamber valve 4A, through the operation of a downward-acting solenoid assembly 12A, and also selects the fuel, the fuel state and adjusts the spark timing curve according to engine speed and load, and other sensor inputs, such as ambient air and coolant temperature. Valve 4A is opened and closed in order to admit cylinder air pressure, which is generated by the compression stroke of the engine, into vaporization chamber 1A, when liquid fuel is being burned exclusively. Conversely, when the engine burns gaseous fuel exclusively, valve 4A is not opened, because there is no (liquid fuel) requirement for fuel vaporization, or the ejection of fuel vapors by cylinder compressed air from vaporization chamber 1A. E.G.R. activation is achieved by substituting compressed cylinder air with exhaust gases in vapor chamber 1A, during the exhaust stroke, the mixture being re-injected during the intake stroke with vaporized fuel. Activated when high exhaust gas temperatures produce excessive N.Ox. levels. Controlled by E.M.U. 3. The required flexibility to accommodate these functions is best enabled by altering the selection,timing, and duration specifications of valve 4A by electronic management unit 3. In order to burn natural gas, or a similiar high-octane fuel, the engine must employ additive compression ratio boost from a external air compressor 143A. Alternatively, the design enables the addition of a air extraction manifold 14B, a outward-flowing check valve 15B, and a air extraction line 16B, so that the engine may have the compression ratio altered in a subtractive manner (eliminating the air compressor), if that option is desired. (see FIG.6 for parts 14B, 15B, and 16B, and their operation)

FIG. 2B is an external detail view looking directly at a intake manifold 11,and a vapor chamber 1A.

FIG. 2C is a top view which illustrates the layout of the combustion chamber, vapor chamber 1A, vapor chamber valve 4A, intake valves 7, exhaust valves 6, and spark plug 9.

OTHER FEATURES:
A. Alteration of spark timing according to fuel type, grade, and state, as well as engine speed and load,
B. Monitoring for detonation by a single system knock sensor, or one knock sensor per cylinder.

Figures 3A, 3B:
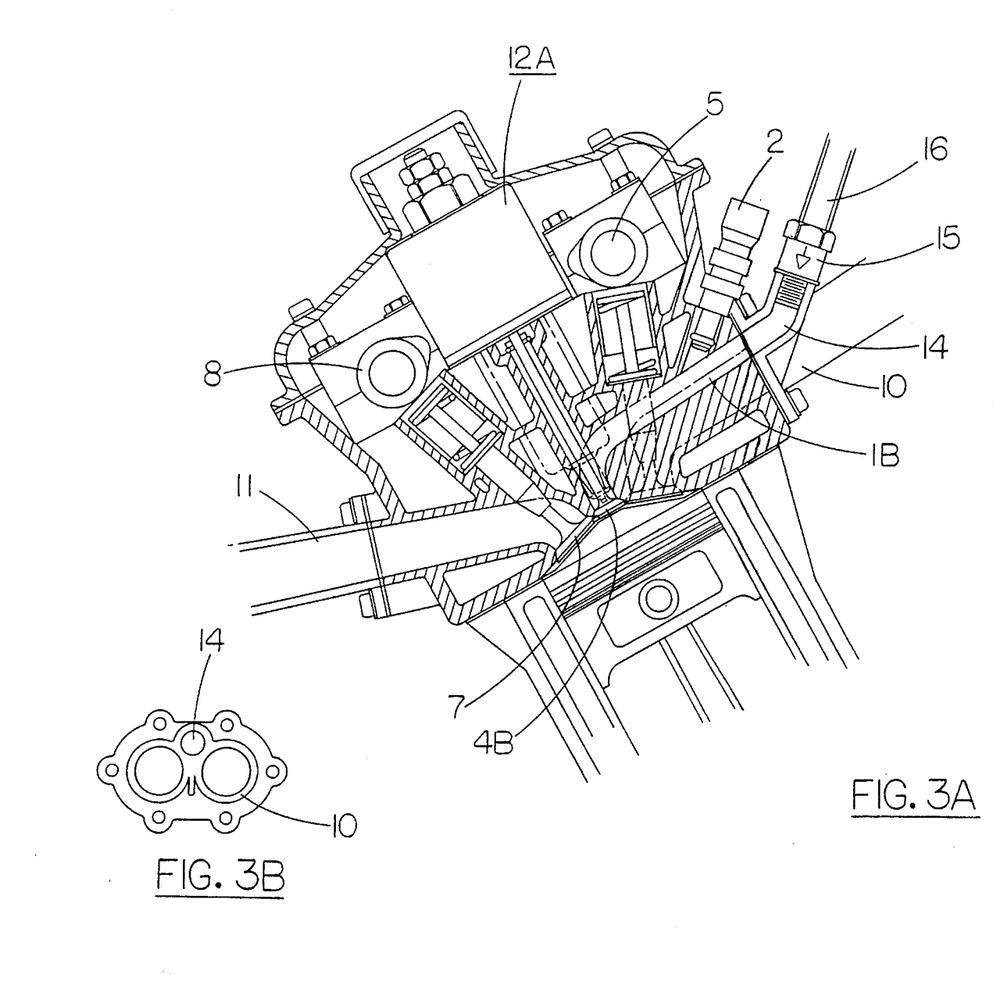
FIG. 3A is a sectioned view of another embodiment of a four-valve D.O.H.C. cylinder head and the associated parts of an internal combustion engine with a exhaust-side vapor chamber which is equipped with a centrally-mounted, electronically-regulated popper valve with compressed air or gaseous fuel feed.
FIG. 3B is a external detail view which illustrates the relationship between the exhaust manifold runners and the vaporization chamber location.

FIG. 3A is a sectioned view of another embodiment of a four valve per cylinder, D.O.H.C. cylinder head and the associated parts of an internal combustion engine which is designed to burn two or more liquid or gaseous fuels, either separately, or in combination. A exhaust side fuel vaporization chamber 1B, which is heated by engine coolant and the adjacent exhaust ports, vaporizes the output of a electronic fuel injector 2, which is controlled for duration and timing by a electronic management unit 3 (not shown), which also controls the timing and duration of a electronically operated vapor chamber valve 4B, through the operation of a downward-acting solenoid assembly 12A, and also selects the fuel, the fuel state, and spark timing curves according to engine speed and load, and other sensor inputs, such as ambient air and coolant temperatures. Valve 4B is opened and closed in order to admit cylinder air pressure, which is generated by the compression stroke of the engine and acts as a propellant for vaporized liquid fuel, into fuel vaporization chamber 1B, when liquid fuel is being burned exclusively. Conversely, when the engine burns straight natural gas, valve 4B is not opened, because there is no (liquid fuel) requirement for vaporization, or the ejection of fuel vapors by cylinder compressed air from vaporization chamber 1B. E.G.R. is activated by substituting compressed air with exhaust gases in vapor chamber 1B during the exhaust stroke, the exhaust gases and fuel vapor being re-injected into the cylinder during the intakestroke. Activated when high combustion temperatures generate excessive N.Ox. levels. Controlled by E.M.U. 3. In order to burn natural gas, or a similiar high-octane fuel, the engine must be supplied with compressed air from a external air compressor through the intake manifold. (see FIG. 8 for compressor details) Gaseous fuel is supplied through a gaseous fuel manifold 14, check valve 15, and supply line 16, and is metered into the cylinder by vapor chamber valve 4B. Supplying gaseous fuel in this matter insures that the gaseous fuel does not occupy volume in the intake manifold and runners, reducing the charge volume of the incoming air, and producing a corresponding power loss. The required flexibility to accommodate these functions is best enabled by altering the selection,timing, and duration specifications of valve 4B by electronic management unit 3.

FIG. 3B is an external detail view which illustrates the relationship between a exhaust manifold 10, and compressed air/gaseous fuel manifold 14. (the inlet location for fuel vaporization chamber 1B).

Figure 3C:
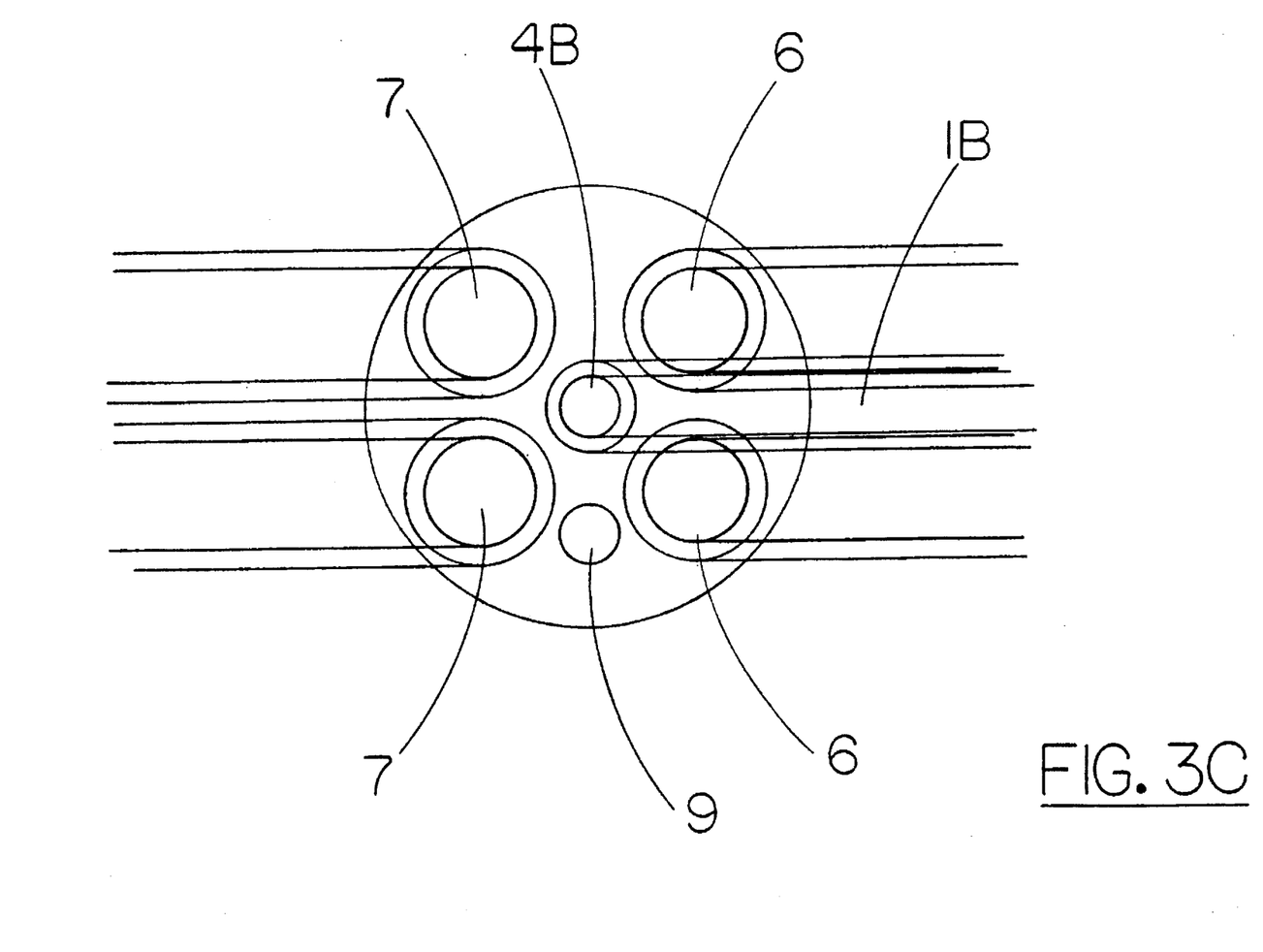
FIG. 3C is a top view which illustrates the layout of the combustion chamber, dual intake and exhaust valves, vapor chamber, and/spark plug.

FIG. 3C is a top view which illustrates the combustion chamber; fuel vaporization chamber 1B, vapor chamber valve 4B, exhaust valves 6, intake valves 7, and spark plug 9.

OTHER FEATURES:
A. Alteration of spark timing according to fuel type, grade, and state, as well as engine speed and load.
B. monitoring for detonation by a single system knock sensor, or one knock sensor per cylinder.

Figures 4A, 4C:
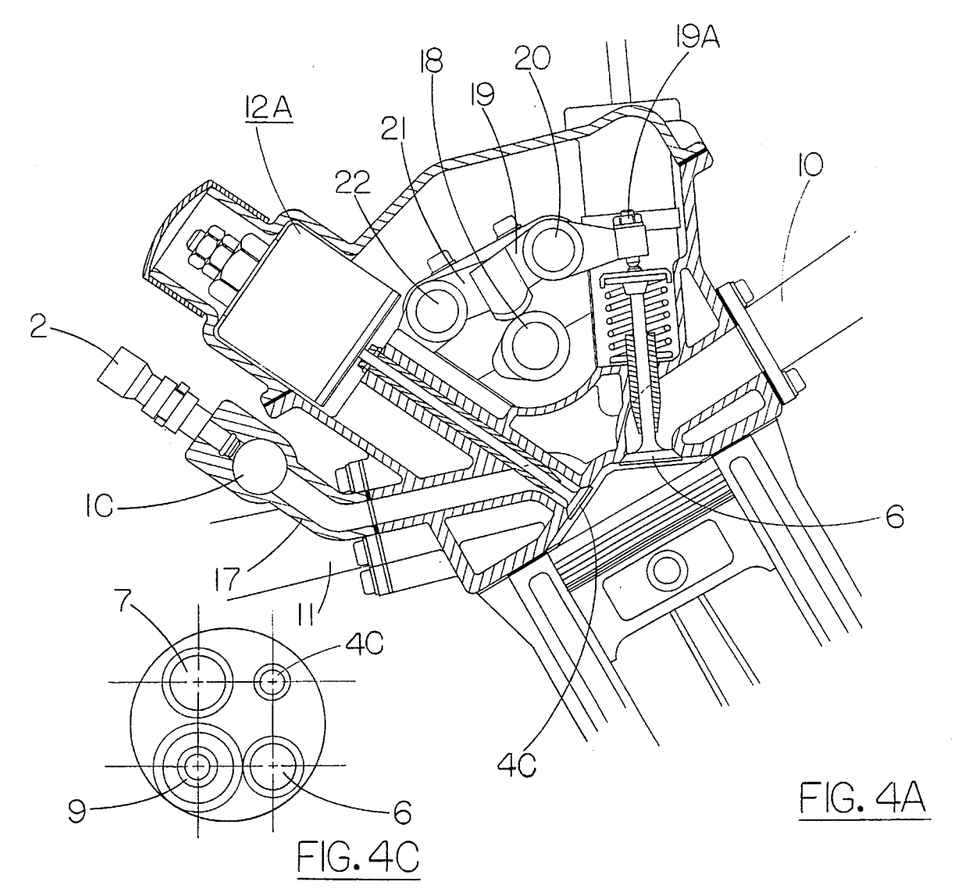
FIG. 4A is a sectioned view of the first embodiment of a 2-valve S.O.H.C. cylinder head and the associated parts of an internal combustion engine with a intake-side external vaporization manifold equipped with a electronically-regulated popper valve, and it's relationship to the exhaust valve.
FIG. 4C is a top view which illustrates the layout of the combustion chamber, single intake and exhaust valves, vaporization chamber valve, and spark plug.

FIG. 4A is a sectioned view of the first embodiment of a two-valve-per-cylinder S.O.H.C. cylinder head and the associated parts of an internal combustion engine which is designed to burn two or more liquid or gaseous fuels, either separately or in combination. This section illustrates the relationship between a vapor chamber valve 4C, and a exhaust valve 6. A external intake-side fuel vaporization chamber 1C, which is part of fuel vaporization manifold 17, vaporizes the output of a electronic fuel injector 2, and is controlled for duration and timing by a electronic management unit 3 (not shown), which also controls the timing and duration of a electronically operated vapor chamber valve 4C, through the operation of a downward-acting solenoid assembly 12A, and selects the fuel, the fuel state, and adjusts the spark timing curve according to engine speed and load demands, and other sensor inputs such as ambient air and coolant temperatures. Gaseous fuel is fed into vapor chamber 1C through a supply line and a inward-flowing check valve 15A, which prevents fuel vapors from entering the gaseous fuel line when supply pressure drops. Supplying gaseous fuel in this manner insures that the gaseous fuel does not occupy volume in the intake manifold and runners, reducing the charge volume of the incoming air, and producing a corresponding power loss. Valve 4C is opened and closed in order to admit cylinder air pressure, which is generated by the compression stroke of the engine, into vaporization chamber 1C, when liquid fuel is being burned exclusively. When the engine burns gaseous fuel exclusively, valve 4C is used to meter gaseous fuel into the cylinders, although the timing is altered by the electronic management unit 3. In order to burn natural gas, or a similiar high-octane fuel, the engine must be supplied with compressed air from a external air compressor through the intake manifold. (see FIG. 8 for compressor details). E.G.R. activation is achieved by substituting compressed air with exhaust gases in vapor chamber 1, during the exhaust stroke, the mixture of exhaust gases and fuel vapor being re-injected into the cylinder during the intake stroke. Activated when high combustion temperatures generate excessive N.0x. levels. Controlled by E.M.U. 3.

Figure 4B:
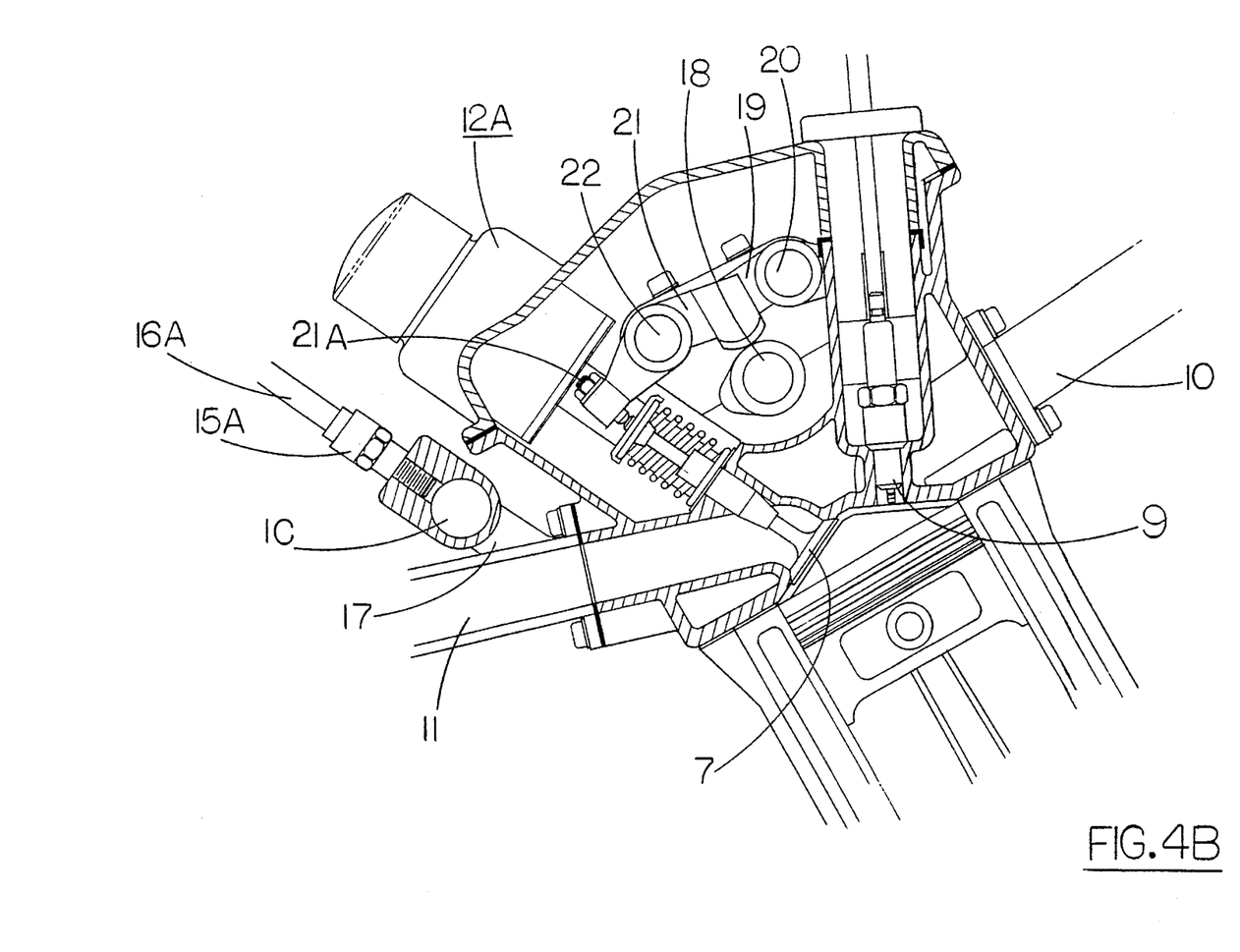
FIG. 4B is another sectioned view of the cylinder head illustrating the relationship between the intake valve and the spark plug.

FIG. 4B is a sectioned view of the cylinder head illustrated in FIG. 4A, which shows the relationship of intake valve 7,to spark plug 9, and the gaseous fuel supply line and check valve assembly mounting to vapor chamber 1C.

FIG. 4C is a top view which illustrates the layout of the combustion chamber; intake valve 7, exhaust valve 6, vaporization chamber valve 4C, and spark plug 9.

OTHER FEATURES:
A. alteration of spark timing according to fuel type, grade, and state, as well as engine speed and load.
B. monitoring for detonation by a single system knock sensor, or one knock sensor per cylinder.

Figure 5A:
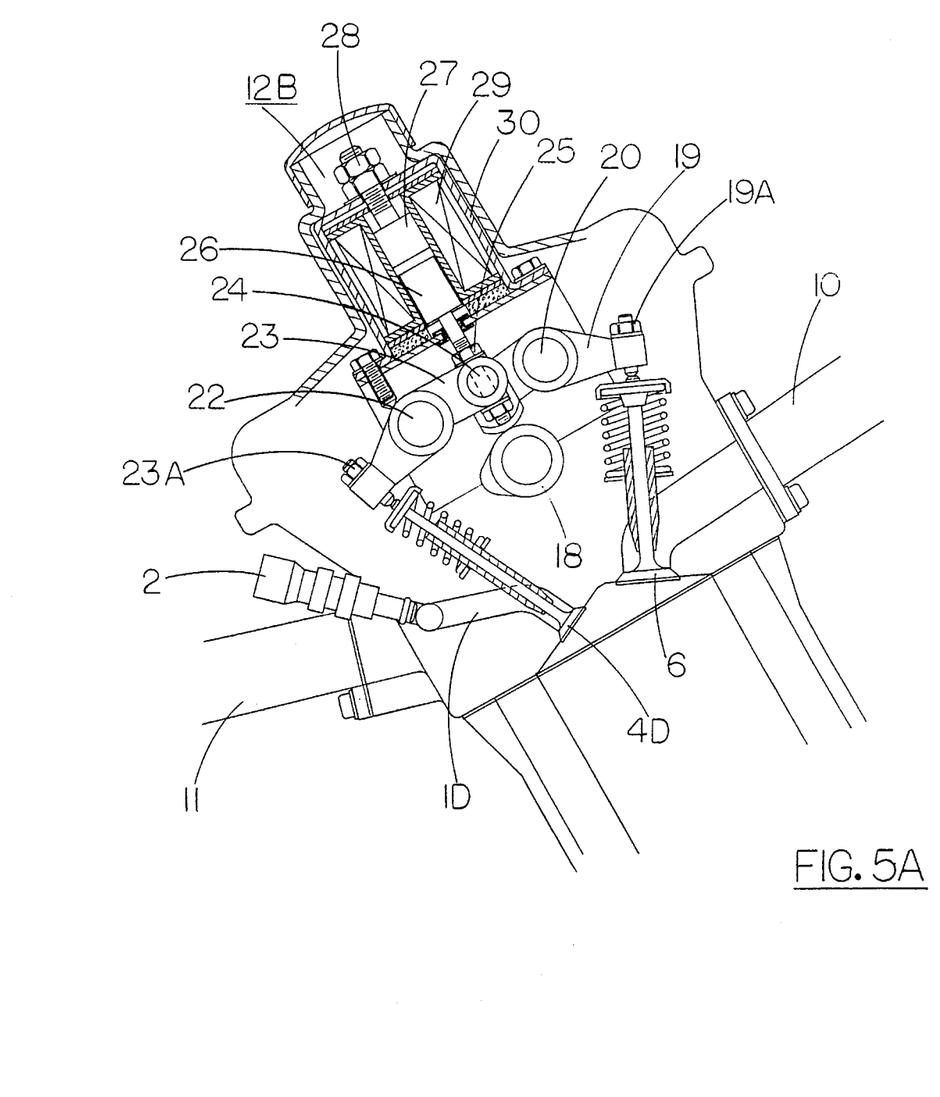
FIG. 5A is a sectioned view of another embodiment of a 2-valve S.O.H.C. cylinder head illustrating two vapor chambers which supply four vapor chamber valves, and the relationship between the electronically-regulated poppet valve and the exhaust valve.

FIG. 5A is a sectioned view of another embodiment of a two-valve-per-cylinder S.O.H.C. cylinder head for a four cylinder engine, which is designed to burn two or more liquid or gaseous fuels, either separately, or in combination. Two intake-side fuel vaporization chambers 1D, which are heated by engine coolant, distribute vaporized liquid fuel to four vaporization chamber valves 4D. Chambers 1D vaporize the output of electronic fuel injectors 2, controlled for duration and timing by a electronic management unit 3 (not shown),which also controls the timing and duration of a electronically-operated vapor chamber valve 4D, through the operation of a upward-acting solenoid assembly 12B, and selects the fuel, the fuel state, and adjusts the spark timing according to engine speed and load, and other sensor inputs, such as ambient air and coolant temperatures. Valve 4D, is opened and closed in order to admit cylinder air pressure, which is generated by the compression stroke of the engine, and acts as a propellant for vaporized liquid fuel, into fuel vaporization chamber 1B, when liquid fuel is being burned exclusively. Conversely, when the engine burns gasous fuel exclusively, valve 4D is not opened, because there is no (liquid fuel) requirement for vaporization, or the ejection of fuel vapors by compressed air from vaporization chamber 1D. Gaseous fuel is supplied to the engine through the intake manifold (not shown). In order to burn natural gas, or a similiar high-octane fuel, the engine must be supplied with compressed air from a external air compressor through the intake manifold.(see FIG. 8 for compressor details)

Solenoid assembly 12B, actuates valve 4D through a vapor chamber valve rocker arm 23, a intake-side rocker arm shaft 22, a armature shaft position adjustment screw 25, a rocker arm connecting pivot 24, and a vapor chamber rocker arm clearance-adjustment screw and lock nut 23A. The remainder of solenoid assembly 12B consists of a armature 26, a armature stop adjustment screw and lock nut 28, which adjusts the air gap between armature 26, and a armature stop 27. Field coils 29, and a solenoid case 30, complete assembly 12B. This variant also exhibits the advantages of sharing existing valve train components (intake-side rocker arm shaft 22), and ease of adjustment and replacement. A exhaust valve 6, is also illustrated, and shows associated hardware such as a single overhead camshaft (S.O.H.C.) 18, a exhaust-side rocker arm 19, a clearance-adjustment screw and lock nut 19A, and exhaust-side rocker arm shaft 20.

Figure 5B:
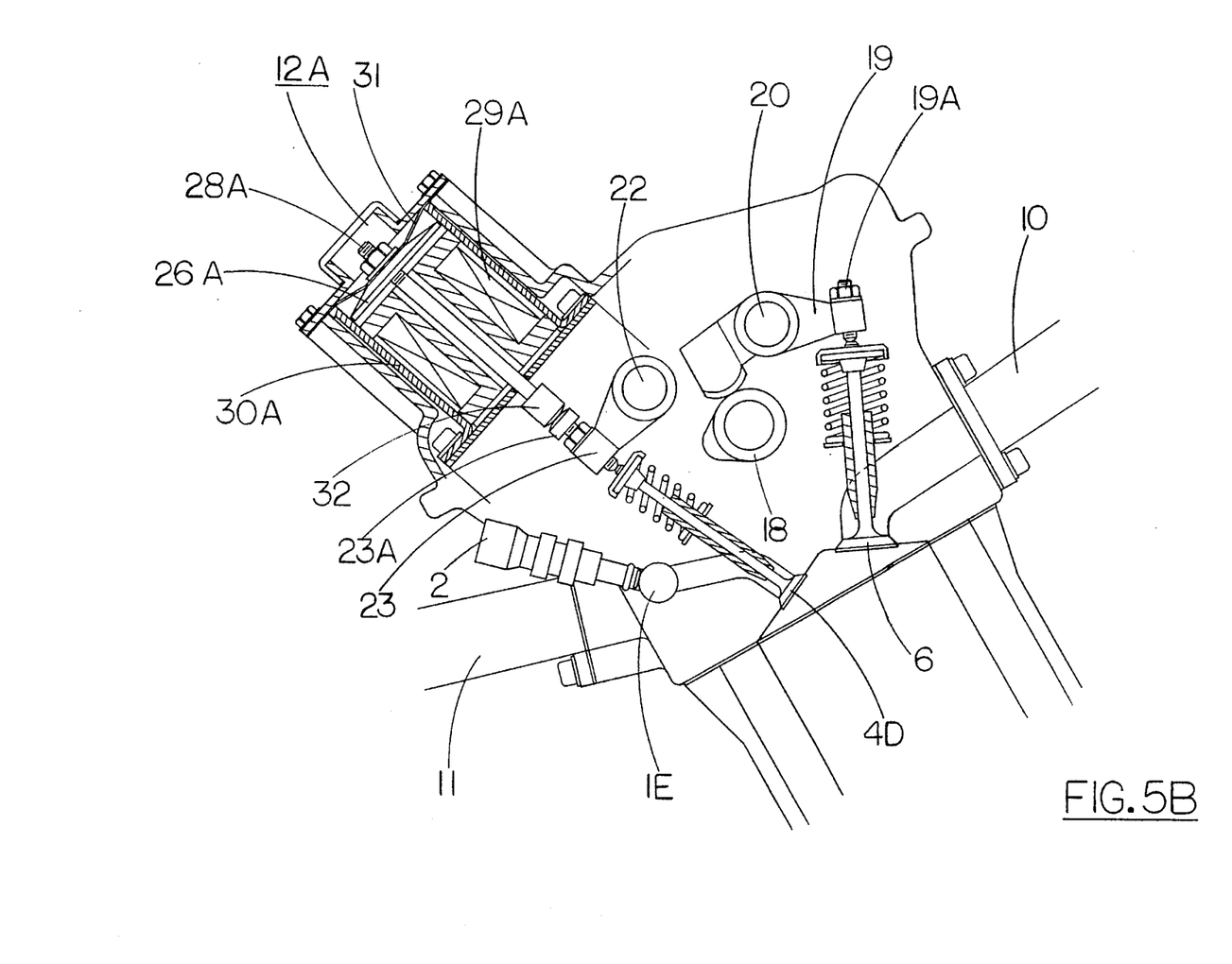
FIG. 5B is a sectioned view of a further embodiment of a 2-valve S.O.H.C. cylinder head illustrating a single-point vapor chamber which supplies four vapor chamber valves through a single plenum, and the relationship between the electronically-regulated popper valve and the exhaust valve.

OTHER FEATURES:

A. alteration of spark timing according to fuel type, grade, and state, as well as engine speed and load.
B. monitoring for detonation by a single system knock sensor, or one knock sensor per cylinder.
C. Separate solenoid valve assemblies 12B, aid in adjustment, removal and replacement. FIG. 5B is a sectioned view of a further embodiment of a two-valve per-cylinder S.O.H.C. cylinder head for a four-cylinder engine which is designed to burn two or more liquid or gaseous fuels, either separately, or in combination. A single intake-side fuel vaporization chamber 1E, which is heated by engine coolant, distributes vaporized liquid fuel through a plenum chamber to four vapor chamber valves 4D. Vapor chamber 1E vaporizes the output of single-point fuel injector 2, controlled for duration and timing by a electronic management unit unit 3 (not shown), which also controls the timing and duration of electronically-operated vapor chamber valve 4D, through the operation of a upward-acting solenoid assembly 12A, and selects the fuel, the fuel state, and adjusts the spark timing according to engine speed, load, and other sensor inputs, such as ambient air and coolant temperature. Valve 4D is opened and closed in order to admit compressed air, which is generated by the compression stroke of the engine, into vaporization chamber 1B, when liquid fuel is burned exclusively. When the engine burns gaseous fuel exclusively, valve 4D meters gaseous fuel into the engine cylinder from plenum 1E, although the timing is altered by the electronic management unit 3. In order to burn natural gas, or a similiar high octane fuel, the engine must be supplied with compressed air from a external air compressor through the intake manifold. (see FIG. 8 for compressor details).

Solenoid assembly 12A, actuates valve 4D through a vapor chamber valve rocker arm 23, a intake-side rocker arm shaft 22, a solenoid plunger shaft 32, and a clearance-adjustment screw and lock nut 23A. The remainder of solenoid assembly 12A consists of a armature 26A, a armature and spring retaining nut 28A, which secures armature 26A, and a armature return spring spring 31, to solenoid shaft 32. Field coils 29A, and a solenoid case 30A, complete the assembly. This variant also exhibits the advantages of sharing existing valve train components (intake-side rocker arm shaft 22), and ease of adjustment and replacement. A exhaust valve 6, is also illustrated, and shows associated hardware such as a single overhead camshaft (S.O.H.C.) 18, a exhaust-side rocker arm 19, a clearance-adjustment screw and lock nut 19A, and a exhaust-side rocker arm shaft

OTHER FEATURES:

A. alteration of spark timing according to fuel type, grade, and state, as well as engine speed and load.
B. monitoring for detonation by a single system knock sensor, or one knock sensor per cylinder.
C. Separate solenoid valve assembly 12A aids adjustment, removal and replacement.

FIG. 6 illustrates a variable-compression ratio cylinder head concept which utilizes a electronically-regulated valve 4B, to relieve compressed cylinder air of varied volumes into a vapor chamber/air extraction manifold 1F/14B. This apparatus alters the compression ratio by varying the timing and duration of the vapor chamber valve 4B, and therefore the pressure and volume, of compressed air relieved from the cylinder.

The system is designed to accommodate a high compression ratio of 13:1 (with no cylinder air bleed by the vapor chamber valve 4B), burning straight natural gas, or a similiar high octane gaseous fuel. This high compression ratio may be lowered in order to burn unleaded gasoline, or a similiar low-octane liquid fuel, and is relieved by the partial diversion of compressed cylinder air into the vapor chamber/air extraction manifold 1F/14B. A outward-flowing check valve 15B, located at the exit of vapor chamber 1F, has a spring-loaded bias to the closed position. When vapor chamber valve 4B closes, check valve 15B also closes, sealing vapor chamber 1F at both ends. This process prevents re-alteration of the compression ratio through compressed air bleed back into the cylinder, and the loss of fuel vapor into the air extraction manifold 14B. Fuel injector 2 is activated only after both valves 4B and 15B are closed to insure retention of the fuel vapor. The volume of vaporized liquid fuel used by the engine also corresponds to the volume of cylinder compressed air relieved into the vaporization chamber/air extraction manifold 1B/14B; the greater the percentage of liquid fuel burned, the lower the compression ratio becomes in order to accommodate the volume and grade of the liquid fuel being utilized. The process is controlled by a electronic management unit 3, (not shown) which receives input through a knock sensor 3, (not shown) to hold combustion below the threshold of detonation. The lowest compression ratio the system accommodates is 9:1, a figure suitable for the combustion of 87 octane unleaded gasoline.(the lower compression ratio figure is easily altered by software modifications)

It should be noted that there are three conditions which govern the operation of the electronic variable air bleed system. The first of these is selection. When gaseous fuels of 120 octane are burned, valves 4A–4D remain closed, as no cylinder air bleed/compression ratio reduction, or fuel vaporization is required. Conversely, if liquid, or low octane fuels are being burned, then valves 4A–4D are operated in accordance to the type and grade of fuels being burned. This covers the use of all liquid fuels with the exception of high octane aviation gasoline, which is an unlikely,and generally unsuitable fuel for motor vehicle use. The second of these aspects is timing, or when valves 4A–4D is opened and closed. For example, if the opening occurs at the B.D.C. (beginning) of the intake stroke, and closes after 30 degrees of engine rotation, both the pressure and the volume which enters vapor chamber 1–1E will equal the swept movement of the piston from B.D.C. to valve closure 30 degrees later. (these figures correspond to the vertical, or upward, movement of the piston in the cylinder, and could be expressed as a linear dimension of piston movement by the equation D(distance in millimeters or inches of piston movement)=S (stroke dimension)—180 (degrees of engine rotation during compression stroke). I.E.,if the stroke dimension is 90 mm, then upward piston travel is 0.5 mm/degree of engine rotation. Timing, along with duration (how long valve 4A–4D remains open), is a primary determinent of how much cylinder air pressure will be blead-off into vapor chamber/air extraction manifold 1–1E/14B, altering the effective compression ratio for the fuel types, grades, states, or combinations thereof being burnt. The volume of vapor chamber 1A–1E is calculated to provide the maximum relief that the system will be called upon to deliver, or a reduction of cylinder pressure from a corresponding compression ratio of 13:1 to 9:1.

FIG. 7 is a sectioned view of a cylinder head and internal parts much like that illustrated in FIG. 6, except that it does not utilize a fuel vaporization chamber 1F, or fuel injector 2, but demonstrates compression ratio alteration by means of a electronically-controlled cylinder relief valve 4B, a outward-flowing check valve 15B, a air extraction manifold 14B, and a air extraction line 16B.

FIG. 8 is a exploded view of a air compressor, which may be driven by a belt and clutch pulley from the engine, (not shown) a stepper motor, a D.C. induction motor or an A.C. induction motor, and the attendant input and output sensing and regulation devices for each drive system. A compressor 143A, of a single basic design, is driven by a belt and pulley from the engine. A electric clutch (not shown), engages and dis-engages the drive to compressor 143A, which works in conjunction with a pressure relief valve 145A, to control the output of compressed air from air compressor 143A. Controlled by E.M.U. 3 (not shown), which receives compressor output data from a R.P.M. sensor 152.

An alternate drive system for air compressor 143A is a D.C. stepper motor 125, which is started, stopped, and positioned, by a electronic management unit 3. The compressor may be driven at any given speed (output), in order to meet engine load, fuel octane, fuel mixture, and fuel state requirements. Compressor 143 or 143A may also be driven by a standard D.C. motor 125A, or a A.C. motor 125B. The volumetric output of compressor 143A, when driven by D.C. motor 125A, or a A.C. motor 125B, is regulated by counting the number of revolutions of the compressor with a sensor 152, and opening the motor control relay (not shown) and/or a pressure relief valve 145A, when the required volumetric output of compressed air or fuel vapor has been reached. Further functions of stepper motor 125 (driving the compressor at speeds faster or slower than engine rotation in fine increments), may be retained with a digital to analog converter circuit (not shown), which governs the speed of D.C. motor 125A, or A.C. motor 125B. The functions of R.P.M. sensing, motor, and relief valve operation, and motor speed control circuit are under the control of the E.M.U. 3. (not shown) Compressor inlet check valve 144, and compressor outlet check valve 145, insures that compressed air flows in one direction only.

I claim:

1. A plural fuel system for an internal combustion engine, said system comprising:
   a. a variable supply of a plurality of fluid fuels differing in octane rating and thermal content, at least one of the fuels being a liquid fuel, the fuels being usable independently or in variable mixtures for delivery to the engine and optimized for specific engine loading and environmental conditions;
   b. optimum engine operation parameters at different engine speeds, loads, and temperatures are correlated to environmental conditions, mapped, and stored in a ROM;
   c. sensors arranged for sensing actual engine operation parameters, load conditions, fuel availability, and environmental conditions;
   d. a processor in communication with the sensors and the ROM for selecting available fuels and fuel delivery rates;
   e. a fuel delivery system controlled by the processor for delivering the selected fuels at the chosen rates to approximate the optimum engine operation parameters at the actual engine speed and load and environmental conditions in real time, the fuel delivery system being arranged for delivering the liquid fuel in either a liquid state or a vapor state; and
   f. a compression ratio adjustment system, including at least one source of compressed air arranged for directing compressed air into the engine, for adjusting the effective compression ratio and fuel charge density as the fuel delivery variations alter octane rating, energy yield, and flame travel velocity.

2. The system of claim 1 wherein the fuel delivery system further includes at least one fuel vaporization chamber in communication with at least one engine cylinder, the vaporization chamber being warm enough to vaporize liquid fuel in advance of an intake stroke of the engine, each vaporization chamber including at least one vapor chamber valve operated by a vapor chamber valve actuation mechanism.

3. The system of claim 2 wherein the at least one vaporization chamber is located on an exhaust side of the at least one cylinder such that the chamber is warmed by exhaust gases released from the at least one cylinder.

4. The system of claim 2 wherein the at least one vaporization chamber is located on an intake side of the at least one cylinder and is warmed by engine coolant.

5. The system of claim 2 wherein the vapor chamber valve actuation mechanism includes a plurality of cams which are used to control the at least one vapor chamber valve, and the at least one vapor chamber valve is in communication with the at least one cylinder.

6. The system of claim 5 wherein the processor selects at least one cam which operates at least one vapor chamber valve during a compression stroke of the engine to allow compressed air into the at least one vaporization chamber when liquid fuel is burned, but when gaseous fuel is burned the vapor chamber valve actuation mechanism is disabled.

7. The system of claim 5 wherein the processor selects at least one cam which operates at least one vapor chamber valve during an exhaust stroke of the engine to allow exhaust gases into the at least one vaporization chamber for exhaust gas recirculation.

8. The system of claim 2 wherein the at least one vapor chamber valve is in communication with the at least one cylinder, the vapor chamber valve actuation mechanism including at least one solenoid assembly, controlled by the processor, which operates at least one vapor chamber valve to allow entry of compressed air during a compression stroke of the engine when liquid fuel is burned, but does not operate the valve during the compression stroke when gaseous fuel is burned.

9. The system of claim 8 wherein the fuel delivery system includes an external gaseous fuel feed manifold located outside a cylinder head of the engine through which gaseous fuel is supplied to the engine.

10. The system of claim 2 wherein the at least one vapor chamber valve is in communication with the at least one cylinder, the vapor chamber valve actuation mechanism including at least one solenoid assembly, controlled by the processor, which operates at least one vapor chamber valve during an exhaust stroke of the engine to allow entry of exhaust gases for exhaust gas recirculation.

11. The system of claim 2 wherein the source of compressed air includes an air compressor controlled by the processor and in communication with the at least one vapor chamber valve, the vapor chamber valve actuation mechanism including at least one solenoid assembly, controlled by the processor, which operates at least one vapor chamber valve to allow entry of compressed air when liquid fuel is burned.

12. The system of claim 2 wherein the at least one vapor chamber valve is in communication with at least one air extraction line, the vapor chamber valve actuation mechanism including at least one solenoid assembly, controlled by the processor, which operates at least one vapor chamber valve during a compression stroke of the engine when liquid fuel or low octane gaseous fuel is burned to allow release of compressed air into the at least one air extraction line, but does not operate the at least one valve during the compression stroke when higher octane gaseous fuel is burned.

13. The system of claim 12 wherein an air extraction manifold is located between the at least one vapor chamber valve and the at least one air extraction line and at least one check valve prevents back flow from the at least one air extraction line into the air extraction manifold.

14. The system of claim 2 wherein:

the at least one vaporization chamber is in an external fuel vaporization manifold which connects each vaporization chamber to a respective engine cylinder;

the at least one vapor chamber valve is in communication with the at least one cylinder to allow entry of air compressed by the at least one cylinder during a compression stroke of the engine;

the vapor chamber valve actuation mechanism includes at least one solenoid assembly, controlled by the processor, which operates at least one vapor chamber valve during the compression stroke when liquid fuel is burned, but does not operate the at least one valve during the compression stroke when gaseous fuel is burned.

15. The system of claim 14 wherein the source of compressed air includes an air compressor controlled by the processor, and the fuel vaporization manifold is in communication with the compressor to allow entry of supplemental compressed air during fuel vaporization.

16. The system of claim 14 wherein relatively high octane gaseous fuel is introduced into the at least one cylinder through the fuel vaporization manifold via the at least one vapor chamber valve, which is opened and closed to meter the gaseous fuel.

17. The system of claim 2 wherein:

the at least one vaporization chamber is in an external fuel vaporization manifold which is connected to the at least one cylinder;

the at least one vapor chamber valve is in communication with the at least one cylinder to allow entry of exhaust gases from the at least one cylinder during an exhaust stroke of the engine for exhaust gas recirculation;

the vapor chamber valve actuation mechanism includes at least one solenoid assembly, controlled by the processor, which operates at least one vapor chamber valve during the exhaust stroke for exhaust gas recirculation.

18. The system of claim 17 wherein relatively high octane gaseous fuel is introduced into the at least one cylinder through the fuel vaporization manifold via the at least one vapor chamber valve, which is opened and closed to meter the gaseous fuel.

19. The system of claim 1 wherein the compression ratio adjustment system further includes:

a compression relief valve in each cylinder of the engine, the relief valve being arranged to relieve compressed air into an air extraction manifold when fuels of relatively low octane levels are burned; and at least one check valve which prevents back flow into the air extraction manifold from an air extraction line.

* * * * *